(12) United States Patent
Johansson

(10) Patent No.: US 9,307,378 B2
(45) Date of Patent: Apr. 5, 2016

(54) LOCATION AWARE TRAVEL MEDIA

(75) Inventor: Kay Johansson, Alamo, CA (US)

(73) Assignee: MobiTV, Inc., Emeryville, CA (US)

( * ) Notice: Subject to any disclaimer, the term of this patent is extended or adjusted under 35 U.S.C. 154(b) by 91 days.

(21) Appl. No.: 12/962,434

(22) Filed: Dec. 7, 2010

(65) Prior Publication Data

US 2012/0143980 A1    Jun. 7, 2012

(51) Int. Cl.
*G06F 15/16*    (2006.01)
*H04W 4/18*    (2009.01)
*H04W 4/02*    (2009.01)

(52) U.S. Cl.
CPC . *H04W 4/18* (2013.01); *H04W 4/02* (2013.01)

(58) Field of Classification Search
USPC ......................................................... 709/217
See application file for complete search history.

(56) References Cited

U.S. PATENT DOCUMENTS

| | | | | |
|---|---|---|---|---|
| 2001/0031640 A1* | 10/2001 | Waller et al. | ................. | 455/456 |
| 2002/0103911 A1* | 8/2002 | Meifu et al. | ................. | 709/227 |
| 2003/0004743 A1* | 1/2003 | Callegari | ......................... | 705/1 |
| 2008/0167943 A1* | 7/2008 | O'Neil et al. | ................... | 705/10 |
| 2009/0119693 A1* | 5/2009 | Higgins et al. | ................... | 725/9 |
| 2011/0213549 A1* | 9/2011 | Hallas | ........................ | 701/201 |
| 2011/0319098 A1* | 12/2011 | Potorny et al. | ............. | 455/456.2 |

OTHER PUBLICATIONS

Marmasse, Natalia, et al., "Location-aware information delivery with comMotion", HUC 2000 Proceedings, Retrieved on the Internet: <http://alumni.media.mit.edu/~nmarmas/emHUC2k.pdf> (Accessed May 8, 2013) 15 pgs.

"7 Things You Should Know about Location-Aware Applications", Educause Learning Initiative, [Mar. 2009]. Retrieved from the Internet: <http://net.educause.edu/ir/library/pdf/ELI7047.pdf> (Accessed May 8, 2013) 2 pgs.

* cited by examiner

*Primary Examiner* — Angela Nguyen
(74) *Attorney, Agent, or Firm* — Kwan & Olynick LLP

(57) ABSTRACT

Mechanisms are provided for identifying, selecting, presenting travel media to users of a mobile device. User location information and directional information is received and travel media including images, video, and audio relevant to an attraction within visual range of a user is presented. A user turning toward a particular monument may be presented with an audio or video tour of the monument that progresses as the user moves about the monument. A user approaching a particular district may be presented with video commercials about fine dining in the area. Presentations may be adjusted as the user changes location or changes viewing direction and selections may be tailored to user interests and preferences.

10 Claims, 6 Drawing Sheets

| | User Tracking Data Store 101 | | | | | |
|---|---|---|---|---|---|---|
| User 111 | Longitute 112 | Latitude 113 | Elevation 114 | Direction 115 | Preferences 116 | Device Capabilities 117 |
| User 121 | Longitute 122 | Latitude 123 | Elevation 124 | Direction 125 | Preferences 126 | Device Capabilities 127 |
| User 131 | Longitute 132 | Latitude 133 | Elevation 134 | Direction 135 | Preferences 136 | Device Capabilities 137 |
| User 141 | Longitute 142 | Latitude 143 | Elevation 144 | Direction 145 | Preferences 146 | Device Capabilities 147 |

| User Tracking Data Store 101 | | | | | | |
|---|---|---|---|---|---|---|
| User 111 | Longitute 112 | Latitude 113 | Elevation 114 | Direction 115 | Preferences 116 | Device Capabilities 117 |
| User 121 | Longitute 122 | Latitude 123 | Elevation 124 | Direction 125 | Preferences 126 | Device Capabilities 127 |
| User 131 | Longitute 132 | Latitude 133 | Elevation 134 | Direction 135 | Preferences 136 | Device Capabilities 137 |
| User 141 | Longitute 142 | Latitude 143 | Elevation 144 | Direction 145 | Preferences 146 | Device Capabilities 147 |

Figure 1

| | | | | | | | | |
|---|---|---|---|---|---|---|---|---|
| Travel Media 211 | Longitude Range 212 | Latitude Range 213 | Elevation Range 214 | Directional Range 215 | Device Requirements 216 | Network Requirements 217 | Preferences 218 | Priority 219 |
| Travel Media 221 | Longitude Range 222 | Latitude Range 223 | Elevation Range 224 | Directional Range 225 | Device Requirements 226 | Network Requirements 227 | Preferences 228 | Priority 229 |
| Travel Media 231 | Longitude Range 232 | Latitude Range 233 | Elevation Range 234 | Directional Range 235 | Device Requirements 236 | Network Requirements 237 | Preferences 238 | Priority 239 |
| Travel Media 241 | Longitude Range 242 | Latitude Range 243 | Elevation Range 244 | Directional Range 245 | Device Requirements 246 | Network Requirements 247 | Preferences 248 | Priority 249 |

Travel Media Data Store 201

Figure 2

LOCATION AWARE TRAVEL MEDIA

DESCRIPTION OF RELATED ART

The present disclosure relates to techniques and mechanisms for implementation of location aware travel media.

DESCRIPTION OF RELATED ART

Mechanisms for presentation of travel media are limited. In some instances, travel guides and travel shows present users with depictions of particular destinations or attractions. Various destinations and attractions also provide media promotions to travelers. Hospitality services will often promote destinations and attractions in a local area for guests and may even have channels devoted to travel media, reviews, and attractions. However, mechanisms for travel media distribution are limited and inefficient.

Consequently, the techniques and mechanisms of the present invention provide improved mechanisms for selection and presentation of travel media.

BRIEF DESCRIPTION OF THE DRAWINGS

The disclosure may best be understood by reference to the following description taken in conjunction with the accompanying drawings, which illustrate particular embodiments of the present invention.

FIG. 1 illustrates a particular example of a user tracking data store.

FIG. 2 illustrates a particular example of a travel media data store.

DESCRIPTION OF PARTICULAR EMBODIMENTS

Figure 3:
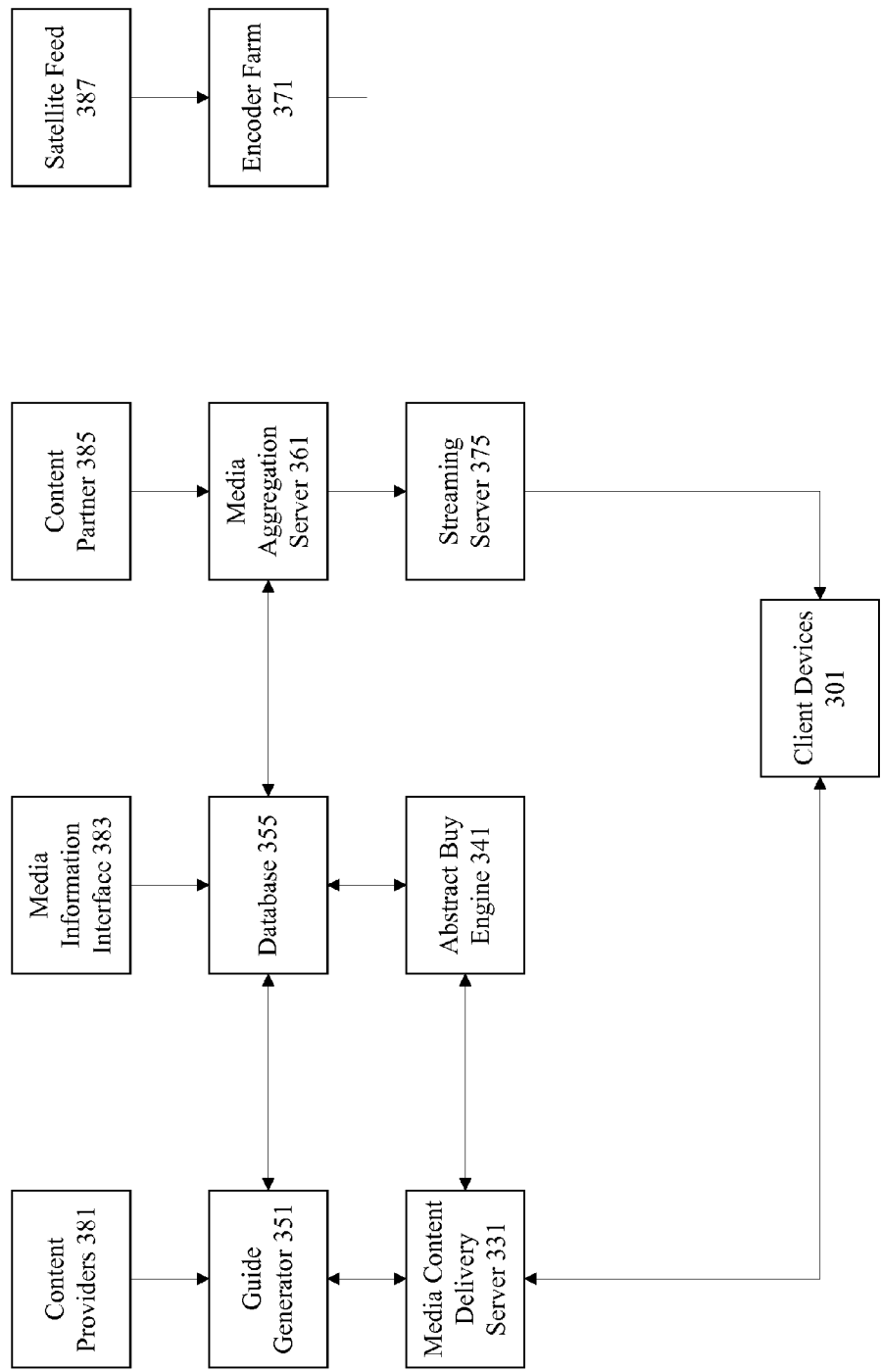
FIG. 3 illustrates a particular example of a travel media delivery system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular types of video streams. However, it should be noted that the techniques and mechanisms of the present invention can be used with a variety of media types. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for identifying, selecting, presenting travel media to users of a mobile device. User location information and directional information is received and travel media including images, video, and audio relevant to an attraction within visual range of a user is presented. A user turning toward a particular monument may be presented with an audio or video tour of the monument that progresses as the user moves about the monument. A user approaching a particular district may be presented with video commercials about fine dining in the area. Presentations may be adjusted as the user changes location or changes viewing direction and selections may be tailored to user interests and preferences.

Particular Embodiments

Travel related information can be presented in a variety of manners. Travel guides and shows present depictions and information about various destinations. Travel advertisements promote attractions. Hotels provide pamphlets and channels dedicated to providing visitors with information about local destinations and attractions. Concierge personnel advise guests on places and services. In many instances, guides will verbally describe various sites as travelers tour attractions. Museum docents provide detailed information to visitors about pieces in a particular exhibit. Automated audio streams may also be provided as visitors enter particular numbers corresponding to particular pieces in a museum. As a visitor moves from one piece to another, the visitor enters a numeric sequence to hear an audio description of the piece on a headset and audio playback device.

However, mechanisms for presenting travel media are limited. In many instances, conventional mechanisms lack not only location awareness, but directional awareness and do not provide a rich media experience. Furthermore, travel media can not be personalized based on a user's individual preferences, interests, listening style, etc. Conventional travel media also have limited flexibility and content. Consequently, the techniques and mechanisms of the present invention provide travel media in a personalized, locationally aware, and directionally aware manner. A user walking past a particular monument on the left may be presented with information about the monument. As the user turns and faces a different direction, a different video or audio sequence may fade in to describe a different structure that corresponds to the direction that user is now facing. In some instances, the information may be a locationally and directionally triggered video or audio tour of a museum. A mobile device may use cell tower triangulation, a global positioning system (GPS), radio frequency identification (RFID), Wi-Fi tracking, magnetism, motion detectors, gyroscopes, laser sight tracking, etc., to determine location, movement, and direction.

According to various embodiments, a system identifies user preferences and describes attractions and destinations in a manner that corresponds to user preferences. In particular embodiments, the user may be particularly interested in historical aspects of an attraction and a historical presentation may be provided to the user when a user approaches an attraction. In other embodiments, the user may be particularly interested in biographies of artists of works in an exhibit as opposed to the pieces of art themselves. Travel media preferences may be used to select media streams of particular genres for presentation to a user. In other examples, travel media preferences include not only historical, biographical, scientific, etc., but also include attraction types such as seafood restaurants or scenic points.

When a user drives or walks in the area of a seafood restaurant, a presentation or advertisement for the seafood restaurant may be viewed on a mobile device. Mobile device video and audio tours of museums, monuments, natural wonders, structures, districts, attractions, shopping areas, etc., can personalized, location aware, directionally aware, etc. In particular embodiments, a user moving to a particular location or facing a particular direction at a particular location automatically triggers presentation of a video or audio stream relevant to the location and direction. A user may set a personalized guided tour that directs a user to travel along a particular route where the user can stop at attractions of interest while a mobile device presents video or audio data associated with the attractions of interest.

FIG. 1 illustrates an example of user tracking data store 101. According to various embodiments, a travel media provider maintains a user tracking data store 101 that tracks users 111, 121, 131, and 141. In particular embodiments, users 111, 121, 131, and 141 may launch a particular service or application that allows monitoring of location and direction information. In some examples, location information for user 111 includes longitude 112, latitude 113, and elevation 114. Location information for user 121 includes longitude 122, latitude 123, and elevation 124. Location information for user 131 includes longitude 132, latitude 133, and elevation 134. Location information for user 141 includes longitude 142, latitude 143, and elevation 144. Location information may be determined automatically using global positioning system (GPS) data, cell tower triangulation, radio frequency identification, laser site line monitoring, user input, etc. The user tracking data store 101 also maintains direction, preference, and device capability information for various mobile devices and/or users. In some instances, multiple users may have the same mobile device.

Direction 115, preferences 116, and device capabilities 117 are maintained for user 111. Direction 125, preferences 126, and device capabilities 127 are maintained for user 121. Direction 135, preferences 136, and device capabilities 137 are maintained for user 131. Direction 145, preferences 146, and device capabilities 147 are maintained for user 141. Direction information may be determined using compasses, user input, etc. Preferences may include types of content preferred by a user. For example, a user may indicate a preference for historically oriented travel media content. In another example, a user may indicate a preference for biographically oriented travel media content. User preferences may also include a desire for video, audio, text, or image content as well as a high level of interest for free versus paid attractions. Users may also specify types of voices, amount of detail, amount of advertising, particular types of attractions, interests, age ranges, gender, favorite attractions, etc.

Device capabilities may also be maintained. Device capabilities may include screen size, resolution, processor speed, data burst support, memory, etc. Different types of media may be provided to the user based on device capabilities. In some examples, device capabilities are assumed or based on device identifiers.

FIG. 2 illustrates one example of a mechanism for selecting travel media. Travel media data store 201 includes media content 211, 221, 231, and 241. Travel media 211, 221, 231, and 241 may be video tours, audio presentations, image advertisements, video streams, etc. According to various embodiments, travel media data store 201 includes longitude ranges 212, 222, 232, and 242, latitude ranges 213, 223, 233, 243, elevation ranges 214, 224, 234, and 244, and directional ranges 215, 225, 235, and 245. It should be noted that a variety of different types of location information can be maintained. In some examples, a user moving into a particular positional range triggers presentation of a piece of travel media. A positional range may be bound by particular coordinates. In other examples, a user in a particular positional range and also facing a particular direction within a directional range triggers presentation of another piece of travel media.

According to various embodiments, the travel media may be selected based on positional range as well as device requirements 216, 226, 236, and 246 and network requirements 217, 227, 237, and 247. Device requirements may indicate processor speed, resolution, display size, data burst support, memory available, etc. Network requirements may include bandwidth, throughput, latency, etc. The travel media data store 201 may also include preference information 218, 228, 238, and 248. Preference information may indicate that a particular piece is more interesting to a particular demographic group or more appealing to users with interests in a particular subject. User preferences are matched with travel media preference information to select content most pertinent to the user.

In particular embodiments, the travel media data store 201 also includes priority information 219, 229, 239, and 249. According to various embodiments, priority information is used to resolve which piece of travel media a particular user is presented with if positional range and requirements are met. For example, a user may be walking between a monument and a tour company and multiple pieces of travel media may be presentable to the user in that particular location. However, a tour company may have paid to place higher priority on their piece of travel media and consequently, that piece of travel media would be displayed. In particular examples, companies may bid for particular priority or placement or travel media.

FIG. 3 is a diagrammatic representation showing one example of a network that can use the techniques of the present invention. According to various embodiments, media content is provided from a number of different sources 385. Media content may be provided from film libraries, cable companies, movie and television studios, commercial and business users, etc. and maintained at a media aggregation server 361. Any mechanism for obtaining media content from a large number of sources in order to provide the media content to mobile devices in live broadcast streams is referred to herein as a media content aggregation server. The media content aggregation server 361 may be clusters of servers located in different data centers. According to various embodiments, content provided to a media aggregation server 361 is provided in a variety of different encoding formats with numerous video and audio codecs. Media content may also be provided via satellite feed 357. According to various embodiments, media content is categorized by using an IVSSE.

An encoder farm 371 is associated with the satellite feed 387 and can also be associated with media aggregation server 361. The encoder farm 371 can be used to process media content from satellite feed 387 as well as from media aggregation server 361 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4, H.263, and H.264. Some example audio codecs include Qualcomm Purevoice™ (QCELP), The Adaptive Multi-Narrow Band (AMR-NB), Advanced Audio coding (AAC), and AACPlus. The media content may also be encoded to support a variety of data rates. The media content from media aggregation server 361 and encoder farm 371 is provided as live media to a streaming server 375. In one example, the streaming server is a Real Time Streaming Protocol (RTSP) server 375. Media streams are broadcast live from an RTSP server 375 to individual client devices 301. A variety of protocols can be used to send data to client devices.

Possible client devices 301 include personal digital assistants (PDAs), cellular phones, smartphones, personal computing devices, personal computers etc. According to various embodiments, the client devices are connected to a cellular network run by a cellular service provider. In other examples, the client devices are connected to an Internet Protocol (IP) network. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 331. The media content delivery server 331 is configured to allow a client device 301 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 351. The guide generator 351 obtains information from disparate sources including content providers 381 and media information sources 383. The guide generator 351 provides program guides to database 355 as well as to media content delivery server 331 to provide to client devices 301.

According to various embodiments, guide generator 351 is connected to a media content delivery server 331 that is also associated with an abstract buy engine 341. The abstract buy engine 341 maintains subscription information associated with various client devices 301. For example, the abstract buy engine 341 tracks purchases of premium packages.

The media content delivery server 331 and the client devices 301 communicate using requests and responses. For example, the client device 301 can send a request to media content delivery server 331 for a subscription to premium content. According to various embodiments, the abstract buy engine 341 tracks the subscription request and the media content delivery server 331 provides a key to the client device 301 to allow it to decode live streamed media content. Similarly, the client device 301 can send a request to a media content delivery server 331 for a most-watched program guide for its particular program package. The media content delivery server 331 obtains the guide data from the guide generator 351 and associated database 355 and provides appropriate guide information to the client device 301.

Although the various devices such as the guide generator 351, database 355, media aggregation server 361, etc. are shown as separate entities, it should be appreciated that various devices may be incorporated onto a single server. Alternatively, each device may be embodied in multiple servers or clusters of servers. According to various embodiments, the guide generator 351, database 355, media aggregation server 361, encoder farm 371, media content delivery server 331, abstract buy engine 341, and streaming server 375 are included in an entity referred to herein as a media content delivery system.

Figure 4:
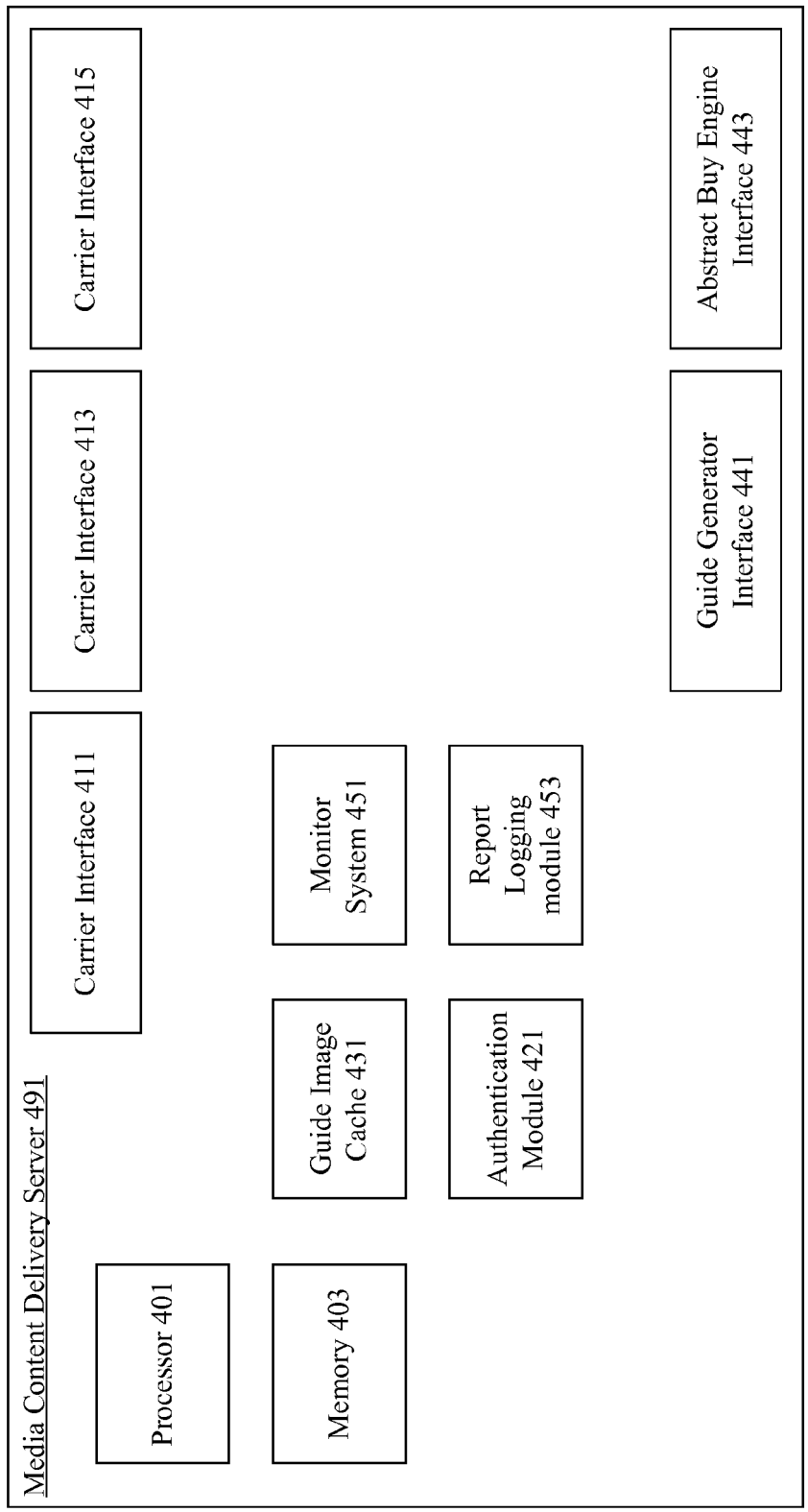
FIG. 4 illustrates a particular example a travel media delivery server.

FIG. 4 is a diagrammatic representation showing one example of a media content delivery server 491. According to various embodiments, the media content delivery server 491 includes a processor 401, memory 403, and a number of interfaces. In some examples, the interfaces include a guide generator interface 441 allowing the media content delivery server 491 to obtain program guide information. The media content delivery server 491 also can include a program guide cache 431 configured to store program guide information and data associated with various channels. The media content delivery server 491 can also maintain static information such as icons and menu pages. The interfaces also include a carrier interface 411 allowing operation with mobile devices such as cellular phones operating in a particular cellular network. The carrier interface allows a carrier vending system to update subscriptions. Carrier interfaces 413 and 415 allow operation with mobile devices operating in other wireless networks. An abstract buy engine interface 443 provides communication with an abstract buy engine that maintains subscription information.

An authentication module 421 verifies the identity of mobile devices. A logging and report generation module 453 tracks mobile device requests and associated responses. A monitor system 451 allows an administrator to view usage patterns and system availability. According to various embodiments, the media content delivery server 491 handles requests and responses for media content related transactions while a separate streaming server provides the actual media streams. In some instances, a media content delivery server 491 may also have access to a streaming server or operate as a proxy for a streaming server. But in other instances, a media content delivery server 491 does not need to have any interface to a streaming server. In typical instances, however, the media content delivery server 491 also provides some media streams. The media content delivery server 491 can also be configured to provide media clips and files to a user in a manner that supplements a streaming server.

Although a particular media content delivery server 491 is described, it should be recognized that a variety of alternative configurations are possible. For example, some modules such as a report and logging module 453 and a monitor 451 may not be needed on every server. Alternatively, the modules may be implemented on another device connected to the server. In another example, the server 491 may not include an interface to an abstract buy engine and may in fact include the abstract buy engine itself. A variety of configurations are possible.

Figure 5:
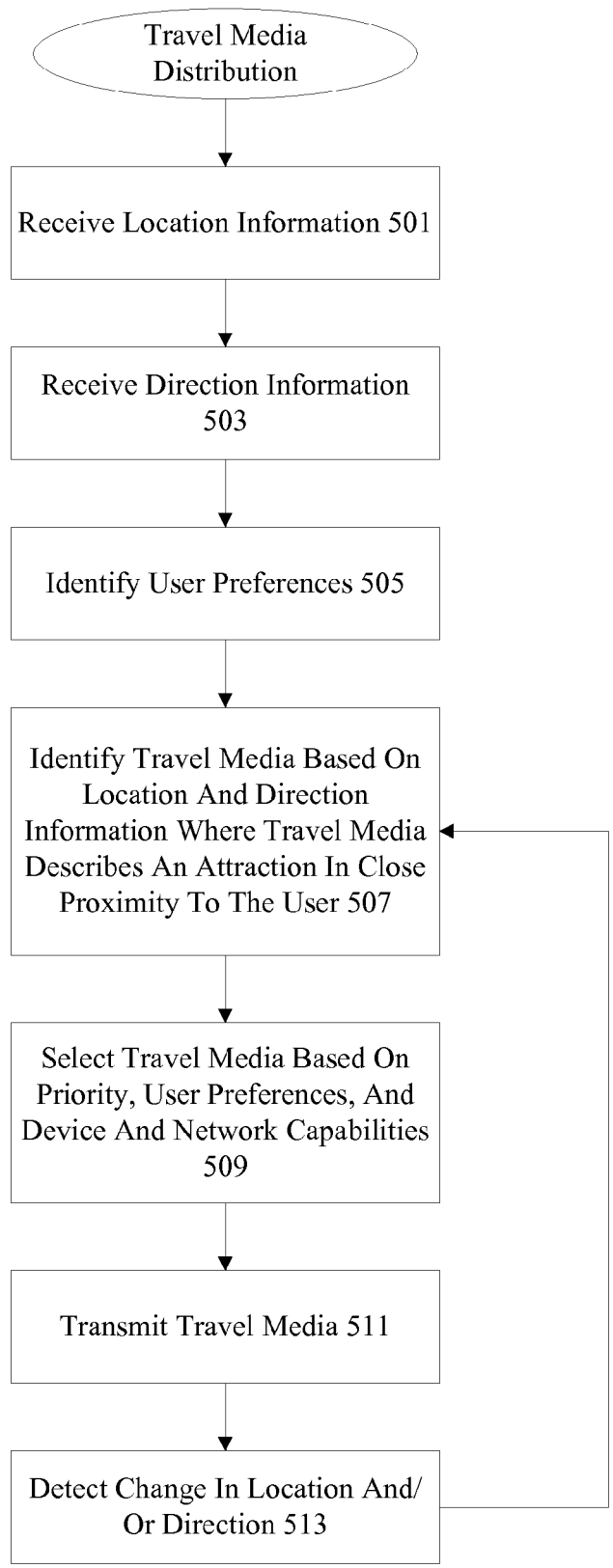
FIG. 5 illustrates a technique for travel media distribution.

FIG. 5 illustrates one example of a technique for travel media distribution. At 501, location information is received. Location information may be derived from GPS, WiFi, cell tower triangulation, etc. At 503, direction information is received. At 505, user preferences are identified. User preferences may include user demographic information, interests, activities, past purchases, etc. At 507, travel media is identified using location and direction information where travel media describes an attraction in close proximity to the user. At 509, travel media is selected based on priority, user preferences, and device and network capabilities. At 511, travel media is transmitted to the user. According to various embodiments, a system monitors to detect any changes in location at 513. Location may be detected using RFID, cell tower triangulation, infrared, etc. Changes in location may be detected in the same manner. If a change in location is detected, a system may provide new travel media based on the change in location.

Figure 6:
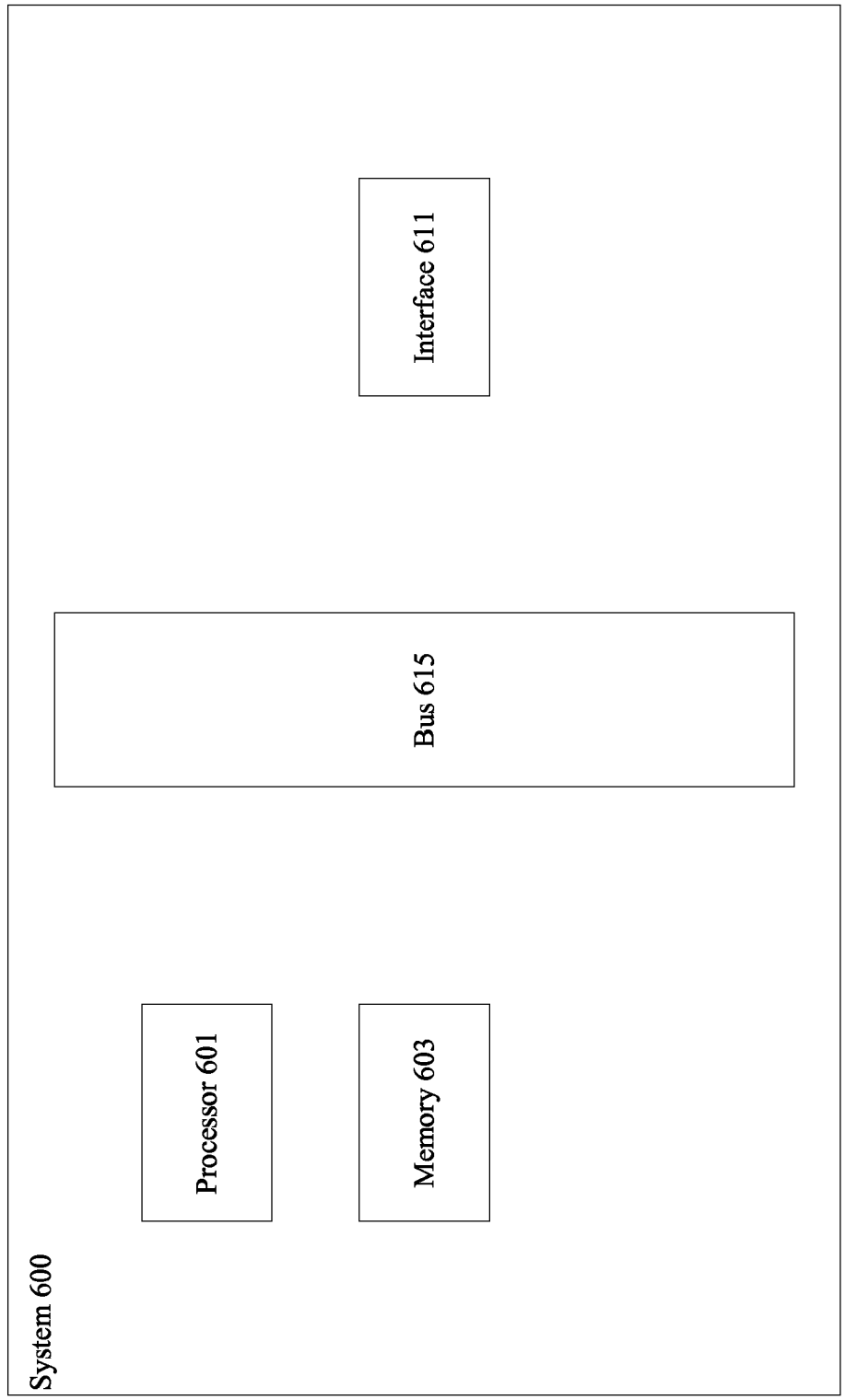
FIG. 6 illustrates a particular example of a computer system.

FIG. 6 illustrates one example of a server that can be used to perform categorization. According to particular embodiments, a system 600 suitable for implementing particular embodiments of the present invention includes a processor 601, a memory 603, an interface 611, and a bus 615 (e.g., a PCI bus or other interconnection fabric) and operates as a streaming server. When acting under the control of appropriate software or firmware, the processor 601 is responsible for modifying and transmitting live media data to a client. Various specially configured devices can also be used in place of a processor 601 or in addition to processor 601. The interface 611 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 600 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 691 handles requests and responses for media content related transactions while a separate streaming server provides the actual media streams.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
  receiving location and direction information associated with a mobile device;
  identifying user preferences associated with a user of the mobile device, the user preferences including a type of content preferred by the user, wherein the user preferences are used to select media streams of particular genres for presentation to the user;
  setting a personalized guided tour based on the user preferences that directs the user to travel along a particular route, wherein the user stops at attractions of interest while the mobile device presents video or audio data associated with the attractions of interest, wherein setting the personalized guided tour includes selecting travel media content from a plurality of media content based on priority, the user preferences, and device and network capabilities of the mobile device, wherein the selected travel media content corresponds to a positional and directional range, wherein priority for travel media candidates is determined based on compensation from interests associated with corresponding attractions or based on accepted bids from interests associated with corresponding attractions;
  identifying first travel media based on the location and direction information, wherein the first travel media describes a first attraction within visual range of the user, wherein movement into a first positional and directional range triggers transmission of the first travel media to the mobile device;
  identifying second travel media based on the change in location or direction of the mobile device, wherein the second travel media describes a second attraction within visual range of the user, wherein movement into a second directional range triggers transmission of the second travel media to the mobile device.

2. The method of claim 1, wherein the first travel media comprises a video tour of a first monument.

3. The method of claim 1, wherein the first travel media and the second travel media are transmitted as part of a video walking tour of a tourist destination.

4. The method of claim 1, wherein the first travel media and the second travel media are transmitted as part of an audio driving tour of a tourist destination.

5. A system, comprising:
  an interface configured to receive location and direction information associated with a mobile device;
  a processor configured to set a personalized guided tour based on user preferences that directs a user to travel along a particular route, wherein the user stops at attractions of interest while the mobile device presents video or audio data associated with the attractions of interest, wherein setting the personalized guided tour includes selecting travel media content from a plurality of media content based on priority, the user preferences, and device and network capabilities of the mobile device, wherein the selected travel media content corresponds to a positional and directional range, wherein priority for travel media candidates is determined based on compensation from interests associated with corresponding attractions or based on accepted bids from interests associated with corresponding attractions, the processor further configured to identify first travel media based on the location and direction information, wherein the first travel media describes a first attraction within visual range of the user, wherein movement into a first positional and directional range triggers transmission of the first travel media to the mobile device, wherein the user preferences include a type of content preferred by the user, and wherein the user preferences are used to select media streams of particular genres for presentation to the user;

an output interface configured to transmit the first travel media to the mobile device;

wherein the processor is configured to detect a change in location or direction of the mobile device and select second travel media, wherein the second travel media describes a second attraction within visual range of the user, wherein movement into a second positional and directional range triggers transmission of the second travel media to the mobile device.

6. The system of claim 5, wherein the first travel media comprises a video tour of a first monument.

7. The system of claim 5, wherein the first travel media and the second travel media are transmitted as part of a video walking tour of a tourist destination.

8. The system of claim 5, wherein the first travel media and the second travel media are transmitted as part of an audio driving tour of a tourist destination.

9. A non-transitory computer readable medium having computer code embodied therein, the computer readable medium comprising:

computer code for receiving location and direction information associated with a mobile device;

computer code for identifying user preferences associated with a user of the mobile device, the user preferences including a type of content preferred by the user, wherein the user preferences are used to select media streams of particular genres for presentation to the user;

computer code for setting a personalized guided tour based on the user preferences that directs the user to travel along a particular route, wherein the user stops at attractions of interest while the mobile device presents video or audio data associated with the attractions of interest, wherein setting the personalized guided tour includes selecting travel media content from a plurality of media content based on priority, the user preferences, and device and network capabilities of the mobile device, wherein the selected travel media content corresponds to a positional and directional range, wherein priority for travel media candidates is determined based on compensation from interests associated with corresponding attractions or based on accepted bids from interests associated with corresponding attractions;

computer code for identifying first travel media based on the location and direction information, wherein the first travel media describes a first attraction within visual range of the user, wherein movement into a first positional and directional range triggers transmission of the first travel media to the mobile device;

computer code for identifying second travel media based on the change in location or direction of the mobile device, wherein the second travel media describes a second attraction within visual range of the user, wherein movement into a second directional range triggers transmission of the second travel media to the mobile device.

10. The non-transitory computer readable medium of claim 9, wherein the first travel media comprises a video tour of a first monument.

* * * * *